Oct. 25, 1938.  P. C. WRIGHT  2,134,169
BLOWTORCH
Filed March 16, 1936  2 Sheets-Sheet 2
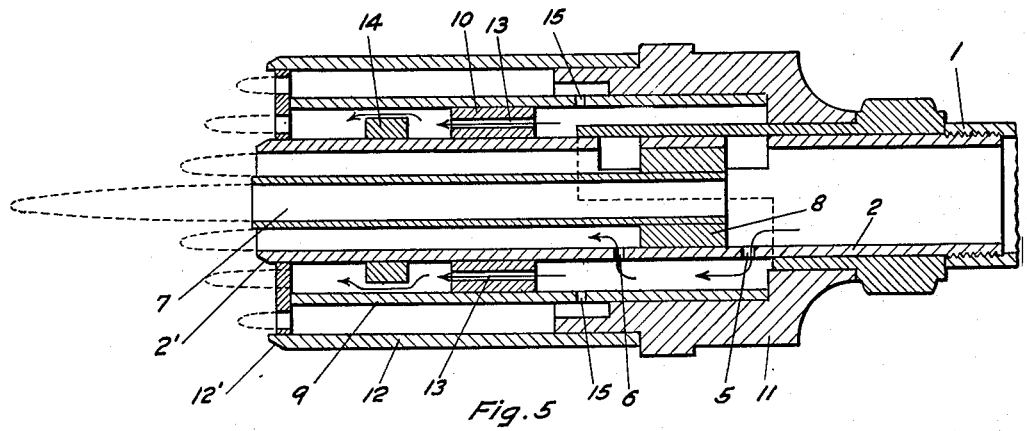
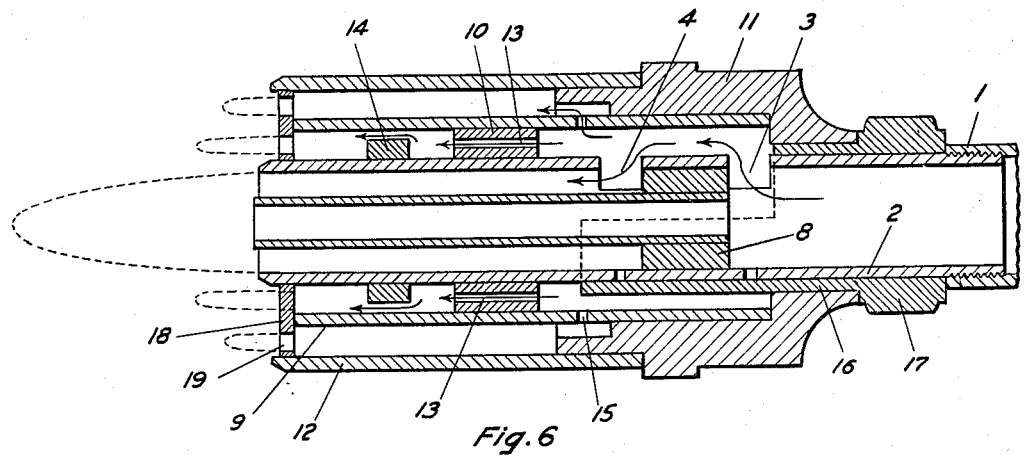
INVENTOR.
*Paul C. Wright*
BY
*H. S. Babcock*
ATTORNEY.

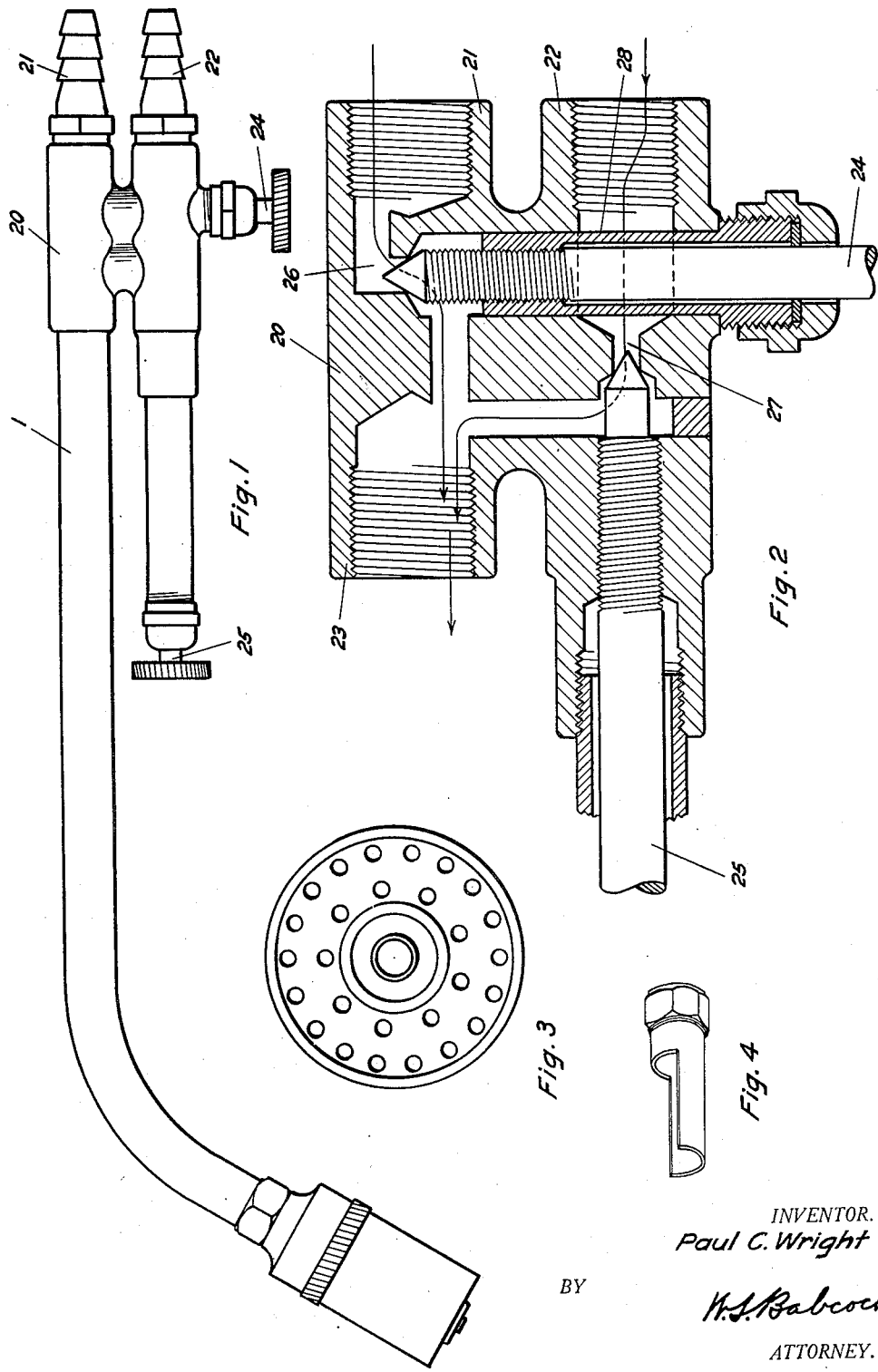
Oct. 25, 1938.   P. C. WRIGHT   2,134,169
BLOWTORCH
Filed March 16, 1936   2 Sheets-Sheet 1
INVENTOR.
Paul C. Wright
BY
W.S.Babcock
ATTORNEY.

Patented Oct. 25, 1938

2,134,169

UNITED STATES PATENT OFFICE 2,134,169

BLOWTORCH

Paul C. Wright, Bexley, Ohio

Application March 16, 1936, Serial No. 69,040

8 Claims. (Cl. 158—27.4)

The invention to be hereinafter described relates to blow torches.

There are many types and constructions of blow torches, both for general work and for specialized purposes. Many kinds of work require a fine pencil of flame with a sharply defined and pointed tip, while others require a less sharply defined point or tip. The torch producing one type of flame tip will not work satisfactorily on work requiring the other type. And, of course, there are gradations from one to the other, both as to the requirements of the work and as to the type of flame tip to meet those gradations of work. So, different types of torches are required for different types of flame tip. The welder, brazer, and other users of torches is, consequently, under the necessity of carrying a plurality of torches so that he may have at hand the particular type of torch required for any particular work.

In torches, as now used, there is no practical means of regulating the volume of mixture supplied to the torch head, burner or nozzle, after it passes the supply control valves of the individual supply lines and enters the fuel or torch tube pipe. The air or oxygen and the gas pipes have their respective individual valves for control of the flow of fluid therethrough to the fuel tube through which the combustible mixture passes to the torch head, burner, or nozzle. These valves are, in well known manner, set or adjusted to deliver into the fuel tube the proper relative proportion of the respective fluid to produce the desired combustible mixture. When the torch is not to be used, these individual valves are closed.

Heretofore, the individual supply pipe valves and the valve housing for them has been arranged on the top or back side of the fuel pipe, making a clumsy and awkward construction always in the way of the operator. To reverse that position and place the supply valves beneath the fuel pipe has, prior to this, seemed impractical as requiring a construction and arrangement having at least several strong probabilities of serious leakage.

The torches in use are continually subject to blowing out, due to excessive pressure in the fuel supply. They have no satisfactory pilot flame provision by which the working flame is instantly lighted and kept lighted.

The main objects of the present invention are to overcome the above and other objections and provide a fluid fuel blow torch of simple, economical and compact construction capable of producing, at will, any type of flame tip required for a very wide range of blow torch work, by a simple, quick, definite adjustment; one in which the supply valves are disposed beneath the fuel tube in a leak-proof assembly; and one in which a pilot flame is kept continually lighted and all blow outs, due to pressure, are eliminated.

In order to more clearly disclose the construction, operation and use of the invention, reference should be had to the accompanying drawings forming part of the present application. Throughout the several figures of the drawings, like reference characters designate the same parts.

In the drawings:—

Fig. 1 is a side elevation of the complete torch;

Fig. 2 is an enlarged central vertical, longitudinal cross section through the supply valve assembly;

Fig. 3 is an enlarged left front view of the torch burner;

Fig. 4 is an enlarged perspective view of the regulator;

Fig. 5 is an enlarged central, vertical, longitudinal cross section through the torch burner adjusted for its most pointed flame tip and pencil flame; and Fig. 6 is a similar view, adjusted for the opposite extreme of flame tip.

Referring to the drawings in detail, 1 indicates the usual fuel or mixture tube of well known construction, through which the usual mixture of air or oxygen and gas is delivered to the burner. The mixture, of course, is under pressure, due to the pressure in the line or pipe of each component. Into the outer or free end of tube 1 is removably threaded or otherwise suitably connected the main flame tube 2 having spaced main fuel feed ports 3 and 4 formed as segments of the cylinder of tube 2. As shown, they are parallel, in alignment, longitudinally of the tube, and extend about one-third of the circumference of the tube. Opposite these main ports 3 and 4 is provided with two small radial perforations or passages 5 and 6, also spaced apart longitudinally of the tube, their center-to-center spacing being about equal to that of ports 3 and 4. Secured coaxially within the main flame tube 2 is a jet flame tube 7 which is maintained in spaced coaxial position by a short cylindrical bushing 8 of a length approximately equal to the distance between ports 3 and 4. As will be seen, tube 7 is coaxial with tube 2 and, therefore, directly in line to receive mixture from tube 2. It is of such diameter as to produce a thin pencil of flame with a sharply pointed flame tip, when receiving the mixture under full pressure and volume. Roughly, as shown, it is approximately one-third the diameter of tube 2, leaving a large annular chamber between it and tube 2. Preferably, bushing 8 makes a tight forced fit with tube 2, thereby securely locking the two tubes in concentric, spaced, assembled relation.

Coaxially disposed about tube 2 and radially spaced therefrom a distance about equal to that between tubes 2 and 7 is a third tube 9. A bushing 10 provides a forced fit, tight and frictional, in tube 9 and on tube 2, securely binding the two together in the same manner as bushing 8 binds tubes 2 and 7 together. Bushing 10 is provided with two small diameter longitudinal bores or passages 13, about 180 degrees apart, for a purpose to be later disclosed. Tube 9 is secured to a cylindrical head 11 by being forced into a cylindrical seat in said head, making another tight frictional connection. An outer shell or fourth tube 12 is similarly secured on an outer cylindrical seat of the same head, coaxially with all above tubes and radially spaced from tube 9 a distance about equal to that between tubes 9 and 2. Between tubes 9 and 2 is a cylindrical baffle block 14, for a purpose to be later disclosed. This baffle is similar to bushing 10, except that it is of less radial thickness. It is seated on and securely attached to tube 2 by a tight forced fit but does not extend to tube 9. It leaves a shallow annular passage between the inner wall of tube 9 and its adjacent wall. At a point between the bushing 10 and the perforations 6 of tube 2, the tube 9 is provided with a similar perforation 15, for a purpose to be later disclosed.

Head 11 is bored to slidably receive in freely rotatable relation, a regulator tube 16 which acts as a sleeve valve to control the amount of mixture passing from the tube to the burner. The outside diameter of this tube is such as to make a snug though free turning fit in the head 11, while the inside diameter similarly receives tube 2. For ready manufacture it is provided with a projecting shoulder 17 which may be formed as a nut, or knurled, or otherwise suitably constructed for ready and easy gripping. Tube 16 is of such length that, when assembled, shoulder 17 will abut the free end of the fuel mixture tube 1, while the body of the tube extends inwardly along tube 2 to a point beyond port 4 and perforation 6. In order that this sleeve may act as a sleeve valve it is cut away for about one half of its circumference for a length somewhat greater than the longitudinal distance between the extreme outer and inner arcuate edges of ports 3 and 4.

In assembled relation, the forward face of the shoulder 17 is engaged by the rear wall or end of head 11. Consequently, the regulator is positively retained against longitudinal displacement.

It will be noticed that head 11 is held in operative position by the bushing 10 which makes a tight frictional connection between tube 2, which is connected to tube 1, and tube 9 which is securely connected to head 11.

Securely seated on tube 2 and in tube 12, by forced friction fit and extending radially from tube 2 to the outer tube 12, across the end of tube 9 which is slightly shorter than either tube 2 or 12, is a pilot flame screen-plate 18 provided with a plurality of small perforations 19, for a purpose to be later disclosed. Plate 18 is a tight friction fit on tube 2 and in tube 12, completely bridging the annular chambers between 2 and 9, and between 9 and 12, respectively.

Preferably, the radial depth between tubes 7, 2, 9 and 12 is approximately the same and about equal to the radius of tube 7.

A single perforation 15 has been mentioned. Preferably, two such are employed. In the drawings they are shown at about 180 degrees apart. They may be at other distances. Also, they may or may not be in the same circumferential plane, as may be desired. They should, of course, be so disposed that the bushing 10 and baffle 14 will be between them and the outer tube ends.

A highly efficient and practical construction provides approximately equal pressure in the chambers between tubes 7, 2, 9 and 12, by certain approximate proportioning of the perforations 5, 6 and 15 and the bores 13. In the illustration selected, the diameters of the different perforations are approximately: perforation 5, 1/16"; perforation 6, .040"; perforations 15, each, .040". Bores 13 have diameters of about .040", each. Thus, the cross sectional area of the perforation 5 is about equal to that of perforations 6 and 15, and bores 13, combined. Also, the cross sectional area of perforations 6 and 15 and bore 13 are substantially equal, one to the other. This means the mixture flowing from tube 2, through perforation 5, will flow equally freely and with equal pressure through perforations 15 and 6 and bore 13, maintaining equal pressure in the chambers between tubes 7 and 2, 9 and 2, and 9 and 12.

In order to avoid, as far as possible, any vacuum effect or eddying at the tube ends, the outer edges of tubes 2 and 12 are tapered or bevelled, backwardly and outwardly from the inner edges as at 2' and 12'.

The working or pressure stream by which the work is done, issues under considerable pressure, as is well known. It creates, around it, a suction or partial vacuum tending to draw the surrounding atmosphere radially inward toward it. And, if the screen pilot-plate 18 were in the same radial plane as the outer ends of tubes 7 and 2, that vacuum action might act so abruptly as to snuff out the adjacent surrounding flame. This is avoided by projecting tubes 7, 2 and 12 appreciably beyond, so that the suction acts on a slant or draws the flame conically inward instead of sharply across the pilot plate at right angles to the plate.

Now, assume that the work to be done is such as requires the least fine or sharp pointed flame tip, the regulator 16—17 is positioned as in Fig. 6. This opens ports 3 and 4, so that the mixture flows from tube 2 through port 3 into tube 9 and back through port 4 into tube 2. At the same time, it flows in about equal volume and pressure through tube 7. The inner cylindrical stream and outer concentric annular stream, each under about the same pressure, form a cone of relatively least sharpness of flame tip. At the same time, perforations 5 and 6 are closed. However, a proportion of the mixture in the chamber between tubes 2 and 9, under substantially the same pressure as that in tube 7 and in the chamber between tubes 2 and 7, passes radially through the restricted perforations 15 into the chamber between tubes 9 and 12. Because of the restricted passage of perforation 15, the pressure in the chamber between tubes 9 and 12 is less than in the chamber between tubes 2 and 9. The remainder of the mixture in the chamber between tubes 2 and 9 passes through restricted bores 13 and around baffle 14 and, in that way, has its pressure greatly reduced. The flame jets issuing through the perforations 19, aligned with the respective chambers will be proportioned, in length, approximately, and in sharpness, approximately, to the respective pressures. The pressure and volume in the chambers between tubes 2 and 9, and tubes 9 and 12, is such, at all times, as to maintain a constant burning pilot flame comprising a plurality of small component flames.

Again, assume that the work is such as requires a long thin pencil flame with very sharp pointed tip—maximum sharpness of flame tip. The regulator 16—17 is positioned as in Fig. 5. That cuts off the large volume supply through ports 3 and 4, and applies most of the pressure in the supply pipe to the gas or mixture in the tube 7, of smallest diameter. This gives a small diameter pencil under relatively high pressure and with a flame tip of maximum sharpness or fineness. Perforations 5 and 6 are opened, so that a small volume of mixture passes from 2 through 5 and into the chamber between tubes 2 and 9. Because the perforations 6 and 15 are of substantially the same cross section, while 5 is considerably greater, and because the bores 13 through bushing 10 are also of about the same cross section as 6 or 15, the volume of the mixture passing through 5 will be split up and its pressure decreased. Part will flow back through 6 into the chamber between 7 and 2 and part will flow out through 15 into the chamber between tubes 9 and 12. Those two volumes will flow out through the perforations 19 in the screen plate 18 and maintain the pilot flame, as in the preceeding adjustment.

The above adjustments, of course, are the two extremes. As between them, the first divides the mixture into two concentric streams, the outer one of considerably greater volume than the inner, and each having applied to it about the same amount of pressure from the supply line, though that applied to the outer volume is appreciably reduced by being applied through a round-about course. The second reduces the stream to a small part of the volume of the supply, but applies to that small volume practically the full pressure of the supply line, and that pressure is applied directly. Practically any gradation or variation between the two may be had by simply correspondingly adjusting the regulator, as will be readily understood.

It should be noted that perforations 5, 6 and 15 are, substantially at right angles to the direction of flow of the mixture, thereby compelling the mixture to accumulate in the respective chambers and flow steadily, continuously, in small volume, and at low pressure through perforations 19, instead of flowing in thin jets or streams at high pressure. This provides the proper conditions for maintaining a pilot flame—low pressure and continuous flowing small volume. The baffle plate 14 assists toward the same result as does, also, the bushing 10 with bores 13. It performs the double function of bushing and baffle plate. Baffle block 14 and bushing 10 may be made as one. In that case, the bores 13 would deliver into a circumferential groove or channel which would be formed at the junction of the two parts. The gas mixture passing through the bores 13 would enter the grooves, turn radially to flow from the groove and then again flow longitudinally, being given the same baffle effect. It would be simply as though the two were moved together and a circumferential groove cut radially inward, at their juncture, to a depth to communicate with the bores 13. It has been found that two bores 13 are sufficient. Consequently, though not necessarily, these are spaced about 180 degrees apart. They may be in the same longitudinal plane of the burner or torch head as perforations 15, or they may be in any longitudinal plane between the perforations 15, as desired.

In blow torches of this general type, the component fluids from which the fuel mixture is produced are supplied by their respective supply pipes to what may be aptly referred to in general terms as a mixing head or block. In this head or block are disposed valves controlling the individual inflow or supply of the respective fluid and the outflow, delivery, or mixture supply, from the mixing head to the fuel or mixture tube 1. This structure is shown in enlarged detail in Figure 2.

Block or head 20 is provided with inlet sockets 21 and 22 for the inlet supply of air or oxygen and gas, respectively, and an outlet or delivery socket 23 for delivery of the mixture to tube 1. In passing through this mixer head, the two components are so regulated and proportioned as to produce the desired combustible mixture. For this purpose, needle valves 24 and 25 are provided. Valve 24 operates on a seat in the passage 26 leading through the mixer head from inlet socket 21 to delivery socket 23 and, in well known manner, controls the quantity or rate of flow of air or oxygen from its supply to the delivery socket 23. At the same time, of course, the pressure is somewhat controlled or regulated by the valve. Valve 25 similarly operates on a seat in the passage 27 leading through the mixer head from socket 22 to socket 23 and similarly controls the quantity or rate of flow of gas from its supply to the fuel mixture tube 1. It will be noticed that valve 24 passes through passage 27 but substantially at right angles to the direction of valve 25. This position of valve 24 is necessary in order to place the mixer head and its valves in the desired location beneath the torch, out of the way of the user. Ordinarily, such an arrangement in a tool of this kind, would result in considerable leakage both of air and gas around valve 24. To completely eliminate all chance of leakage and seal off the valve, a sleeve 28 is used. This sleeve is a tight fit in a bore which intersects passages 27 and 26. Consequently, these passages are completely sealed off from the interior of the sleeve. Valve 24 passes inwardly through the sleeve and is threaded through its inner end to provide the usual threaded adjustment by rotation. Gas entering through socket 22 will flow around sleeve 28 and through passage 27 without leakage about valve 24. Air or oxygen entering socket 21 will flow through passage 26 to socket 23 without leakage about valve 24. Of course, both valves are provided with suitable packings. A very slight adjustment of the valves gives the desired regulation or control, as will be well understood. As shown in Fig. 2, the valves are closed, the arrows indicating the course of the flow of the fluids when they are opened.

With such a construction and arrangement, the type of flame and flame tip for any desired blow torch work, within a wide range, may be instantly provided by a single simple torch, and there is always a pilot flame to instantly relight the torch flame whenever excessive pressure blows it out. A very slight movement of the regulator "does the trick" and it is always "right at the user's finger tips", literally as well as figuratively.

It is believed that the construction, operation and use of the invention will be clear from the preceding detailed description.

Many changes may be made in the construction, arrangement, and disposition of the various parts of the invention, within the scope of the appended claims, without in any way departing from the field of the invention, and it is meant to include all such within this application wherein only a preferred form has been illustrated by way of example and with no intention to any degree limit the invention thereby.

Having thus described my invention, what I claim and desire to protect by Letters Patent is:

1. A blow torch comprising, a flame tube provided with spaced ports, a jet tube coaxially disposed therein, spaced therefrom and communicating therewith, a bushing carried by said jet tube and closing the space between said tubes between said ports and means for supplying a fuel mixture to the aforesaid flame tube.

2. A blow torch comprising, a flame tube provided with two sets of spaced ports, a jet tube coaxially disposed therein, spaced therefrom and communicating therewith, a bushing carried by said jet tube and closing the space between said tubes between said ports, means for closing one set of said ports and means for supplying a fuel mixture to the aforesaid flame tube.

3. A blow torch comprising, a flame tube provided with sets of spaced ports, a jet tube coaxially disposed therein, spaced therefrom and communicating therewith, a bushing carried by said jet tube and closing the space between said tubes between said ports, means for simultaneously closing one set of said ports and opening another set and means for supplying a fuel mixture to the aforesaid flame tube.

4. A blow torch comprising, a flame tube provided with sets of spaced ports, a jet tube coaxially disposed therein, spaced therefrom and communicating therewith, a bushing carried by said jet tube and closing the space between said tubes between said ports, means for simultaneously closing one set of said ports and opening another set, a tube coaxially disposed in spaced relation exteriorly of said flame tube and communicating therewith through the aforesaid ports, a pilot plate bridging the spaces between said flame tube and exterior tube, and means for supplying a fuel mixture to the aforesaid flame tube.

5. A blow torch comprising, a flame tube provided with sets of spaced ports, a jet tube coaxially disposed therein, spaced therefrom and communicating therewith, a bushing carried by said jet tube and closing the space between said tubes between said ports, means for simultaneously closing one set of said ports and opening another set, a tube concentrically disposed in spaced relation exteriorly of said flame tube and communicating therewith through the aforesaid ports, and provided with ports, a bushing securing said outer tube to said flame tube by frictional force fit, a head secured to said outer tube by frictional force fit, an imperforate cylindrical shell coaxially disposed in spaced relation exteriorly of said outer tube and communicating therewith through the ports in said outer tube, a pilot plate bridging the space between said flame tube and said outer tube and between said outer tube and said shell and means for supplying a fuel mixture to the aforesaid flange tube.

6. A blow torch comprising a stationary flame tube having spaced ports, a jet tube coaxially disposed within said flame tube in spaced relation thereto, continuously communicating therewith and stationary relatively thereto, a bushing carried by said jet tube and closing the space between said tubes, a tube exterior to said flame tube, concentric therewith, stationary relatively thereto, and communicating therewith, pressure reducing means between said flame tube and said tube exterior thereto, a tube exterior to the tube which is exterior to the flame tube, concentrically spaced therefrom, communicating therewith and stationary relatively thereto, and means selectively controlling the flow of fuel to the space between the flame tube and the jet tube and to the space between the flame tube and the tube exterior thereto.

7. A blow torch comprising a stationary flame tube having spaced ports, a jet tube coaxially disposed within said flame tube in spaced relation thereto, continuously communicating therewith and stationary relatively thereto, a bushing carried by said jet tube and closing the space between said tubes, a tube exterior to said flame tube, concentric thereto, stationary relatively thereto, and communicating therewith, pressure reducing means between said flame tube and said tube exterior thereto, a tube exterior to the tube which is exterior to the flame tube, concentrically spaced therefrom, communicating therewith and stationary relatively thereto, means controlling the flow of fuel to the space between the flame tube and the jet tube and to the space between the flame tube and the tube exterior thereto, and a pilot flame screen plate carried by said flame tube and extending radially to the outermost tube and across the annular spaces between the tubes.

8. A blow torch comprising a head, a stationary flame tube mounted therein and provided with distributing ports, a jet tube concentrically disposed in said flame tube, concentric therewith and stationary relatively thereto, a bushing carried by said jet tube and closing the space between said tubes, a plurality of tubes mounted in said head concentric with said flame tube and with each other, exterior to said flame tube, spaced from said flame tube and from each other, communicating with said flame tube and with each other, stationary relatively to said flame tube and to each other, a sleeve valve rotatably mounted in said head and controlling the flow of fuel from said flame tube to the space between it and said jet tube and the flow from the flame tube to the space between it and the tube next exterior thereto.

PAUL C. WRIGHT.